(12) United States Patent
Gonzales

(10) Patent No.: US 8,077,846 B2
(45) Date of Patent: Dec. 13, 2011

(54) COMBINATION UNIVERSAL TELEPHONE AND REMOTE CONTROL DEVICE

(76) Inventor: David Luis Gonzales, Avalon, CA (US)

( * ) Notice: Subject to any disclaimer, the term of this patent is extended or adjusted under 35 U.S.C. 154(b) by 646 days.

(21) Appl. No.: 12/313,626

(22) Filed: Nov. 24, 2008

(65) Prior Publication Data

US 2010/0128859 A1  May 27, 2010

(51) Int. Cl.
*H04M 11/00* (2006.01)
(52) U.S. Cl. ......... 379/102.03; 379/102.01; 379/102.02; 455/575.3; 455/90.3
(58) Field of Classification Search ............. 379/110.01, 379/102.01, 102.2, 102.03, 433.12, 433.04, 379/433.09, 433.01; 348/734, 14.01; 455/569.1, 455/575.3, 90.1–92
See application file for complete search history.

(56) References Cited

U.S. PATENT DOCUMENTS

| 5,963,624 | A | 10/1999 | Pope |
| 6,295,448 | B1 | 9/2001 | Hayes |
| 6,445,933 | B1 | 9/2002 | Pettit |
| 6,628,964 | B1 | 9/2003 | Bates |
| D488,145 | S | 4/2004 | Abdelal |
| D489,047 | S | 4/2004 | Luckett |
| 7,042,366 | B1 | 5/2006 | Mui |

*Primary Examiner* — Vivian Chin
*Assistant Examiner* — Friedrich W Fahnert
(74) *Attorney, Agent, or Firm* — Theresa M. Seal

(57) ABSTRACT

A universal combination cordless phone/remote control device for simultaneously answering incoming phone calls, messages, texts, etc., while operating a television and peripheral equipment includes a remote control side for controlling and operating the television and peripheral equipment and a cordless phone side for controlling various standard telephonic operations with both the remote control side and the cordless phone side including electrical charging contacts that engage charging contacts located on the upper surface of a portable lightweight charging cradle when the control device is placed upon the charging cradle for electrical charging.

8 Claims, 4 Drawing Sheets

COMBINATION UNIVERSAL TELEPHONE AND REMOTE CONTROL DEVICE

FIELD OF THE INVENTION

The present invention pertains to electronic equipment and devices, and more particularly pertains to a combination electronic control device for various types of electrical devices.

BACKGROUND OF THE INVENTION

Electronic devices and equipment are ubiquitous in modern life. From household cooking appliances to lighting fixtures and all manner of electronic entertainment devices, the modern world depends on such devices and equipment for entertainment, sustenance, and energy. Prior generations controlled these devices in a discrete manner wherein each device had its own switch, outlet, control panel, or on/off button. However, as the electronics has improved, and as demands for convenience and comfort have grown, there have been numerous improvements and modifications to such control systems. Some of the improvements include putting more than one device on the same circuit and combining the operation and control of more than one electronic device on one control device. Moreover, with the enormous increase in the variety of home entertainment devices, from HD TV's to CD/DVD players to the range of video games, control devices have acquired a multi-faceted scope. It is certainly more economical to reduce the number of control devices both to save in batteries and to reduce the hassle of always hunting down and locating the right control device for the appropriate piece of equipment. Although cell phones now dominate the landscape, POTS (plain old-fashioned telephone service) still remain in many homes and businesses, and it would be desirable to integrate a phone with the television remote control so that the individual would have control of the two primary components—television and telephone—incorporated into one device. The prior art discloses a number of different devices and systems that attempt to incorporate these features.

For example, the Pope patent (U.S. Pat. No. 5,963,624) discloses a system that includes a base unit, a handset, and a number of electronic appliances (tv, cable, cd, etc,) wherein the control codes are stored in the base unit and accessed by the control panel of the handset to operate the particular electronic appliance.

The Hayes, Jr. et al. patent (U.S. Pat. No. 6,295,448 B1) discloses a method and apparatus for effectuating unidirectional and bidirectional communication directly between a mobile telephone and another device without the use of a mobile telephone system to carry the communication.

The Bates et al. patent (U.S. Pat. No. 6,628,964 B1) discloses a combination cordless telephone and remote control for entertainment equipment.

The Pettit patent (U.S. Pat. No. 6,445,933 B1) discloses a teleremote device that includes a cordless or cellular telephone in combination with a remote controller for a television or other electrical appliance.

The Mui et al. patent (U.S. Pat. No. 7,042,366 B1) discloses a remote control that is sold with various audio-visual equipment and which is used to control other types of electrical devices such as toy and home appliances.

The Abdelal patent (U.S. design Pat. No. D488,145 S) discloses a design for a cordless phone and remote control with a base.

Nonetheless, despite the ingenuity of the above-described devices and systems, there remains a need for a combination device that makes the operation of a telephone or a universal remote easier and labor saving.

SUMMARY OF THE INVENTION

The present invention comprehends a universal combination cordless remote control device that combines a cordless phone with a universal remote control unit. The universal telephone and remote control unit allows one to control all the components to your TV (video games, CDs, DVDs) and also answer and talk on the phone at the same time and without putting the device down. Thus, when a phone call comes in when the individual is watching TV (or watching a CD, DVD, or playing a video game), the individual simply turns the universal combination remote control device over and answers the phone by pressing a button.

The universal combination control device includes a main body member or two-sided housing having a universal remote side and an opposite cordless phone side. A cylindrical seating member extends across the two-sided housing, and a port is located on the lower or bottom edge for receiving therein a removably insertable information storage card to save the various control programs for the entertainment components and peripheral equipment that the individual desires to control through the universal combination control device.

The universal remote control side includes various buttons to control such parameters as display the program guide, menu, search, mute, caption on/off, volume, channel, replay, stop, start, forward, reverse, etc., and a cross-shaped up/down and left/right channel select button that is used to control and select volume and channel. In addition, located on the universal remote side is a plurality of individual numeric channel buttons for manual channel selection. Also, disposed on either side of the cylindrical seating member is an electrical contact for recharging purposes.

Opposite of the universal remote side is a cordless phone side. Arranged on the cordless phone side is an LCD display screen, a plurality of numeric keypad buttons, an answer/talk button, an end button, a speed dial button, a redial button and voice transmitting and receiving apertures. Other buttons can include select, delete, memory, pause, channel, and volume. In addition, is a pair of electrical contacts disposed on either side of the cylindrical seating member for recharging of the universal combination control device. In order to prevent the buttons on the side of the universal combination control device that is not in use from accidentally being pressed, a flip-top lid pivotally attached to the upper end of the control device and which can be selectively folded down upon—but not pressing directly against—the side of the universal combination control device not in use. The flip-top lid would prevent buttons from being accidentally pressed thereby causing the changing, deleting, stopping a program in the middle of running or causing the disconnection of the telephone call.

The universal combination control device also includes a charging cradle for charging the control device. The charging cradle includes an upwardly facing surface that is commensurate in size and configuration with the control device. Extending across the facing surface is transversely extending seating groove for receiving the cylindrical seating member. Located on opposite sides of the seating groove are charging cradle electrical contacts and when the cylindrical seating member is placed in the seating groove the electrical contacts on either side of the control device are aligned with the charging cradle electrical contacts thereby facilitating the electrical charging of the control device. The charging cradle also includes a pair of ports or plugs for a phone line and a power supply, and a charging light for providing visual evidence that the control device is charging or fully charged.

It is an objective of the present invention to provide a universal telephone/remote control device that is a combination cordless phone and universal remote control.

It is another objective of the present invention to provide a combination universal remote control device that includes a cordless phone on one side of the housing and a universal remote control on the other side of the housing.

It is yet another objective of the present invention to provide a combination universal telephone/remote control device that includes lift-up lids so that the buttons on both sides of the device cannot be accidentally pressed.

Still another objective of the present invention is to provide a combination universal remote/control device that avoids one having to put the remote control down to get up to answer the phone while watching TV or use several remote controls to control different electronic items.

Still yet another objective of the present invention is to provide a combination universal control device that would utilize only one gadget thereby making the remote control efficient.

Still yet a further objective of the present invention is to provide a combination universal remote/control device that would result in less clutter by eliminating some remote control devices and greatly reduce the number of batteries that need to be bought.

A further objective of the present invention is to provide a combination universal/remote control device that includes lift-up lids to prevent buttons from being accidentally pressed and thereby causing a disconnection or an accidental changing of a channel in the middle of a TV show.

A still further objective of the present invention is to provide a combination universal/remote control device that organizes all components into one remote control device so that you can control your TV and answer and talk on the telephone without putting anything down.

Another objective of the present invention is to provide a combination universal/remote control device wherein one can control the television while answering the phone by simply touching the appropriate button on the phone side of the remote control device.

Another further objective of the present invention is to provide a combination universal/remote control device that allows one to watch television, control the audio/video devices and answer the telephone.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Figure 1:
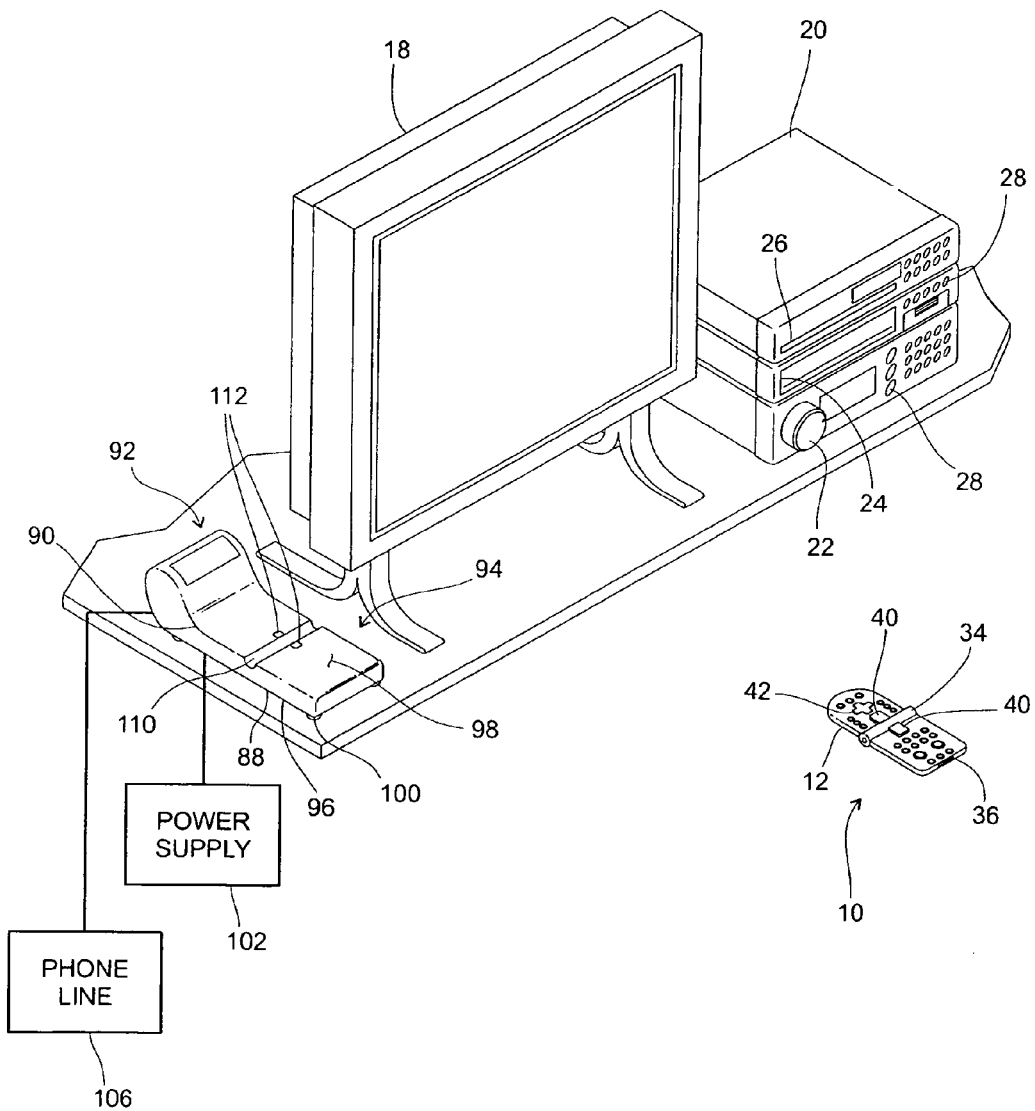
FIG. 1 is a perspective view of a universal combination telephone and remote control device of the present invention that is used in conjunction with a television set and peripheral entertainment equipment such as a combination radio/CD/DVD player.

Illustrated in FIGS. 1-6 is a universal combination cordless phone and television remote control device 10 that allows the individual to conveniently and easily control the television and any peripheral device (radio, CD, DVD player, etc.,) as well as receiving telephone calls and transmitting telephone calls while remaining seated. Thus, one side of the control device 10 is dedicated to the telephone operations and the other side of the device 10 is dedicated to television and peripheral equipment operations.

The universal combination cordless phone/television remote control device 10 includes a main body member or two-sided housing 12 further divided or separated into a universal remote side 14 that can be programmed to control the range of televisions and peripheral equipment on the market. The opposite side of the control device 10 is the cordless phone side 16. For representative purposes a television 18 is shown along with the peripheral equipment in FIG. 1 that includes a combination radio, CD, DVD player 20 of a type commonly found in retail and consumer electronic stores. The combination radio, CD, DVD player 20 includes radio channel select knob 22, CD slot 24, DVD slot 26, and the various accompanying control buttons 28. The control device 10 includes an upper end 30 and an opposite lower end 32, and extending transversely across the mid-section of the device 10 is a cylindrical seating member 34. Illustrated in FIGS. 2 and 3 is a card slot 36 located at the lower end 32 of the control device 10 for receiving therein an electronic readable data disc or card 38 for saving various functions and operations that have been programmed into the control device 10.

Figure 2:
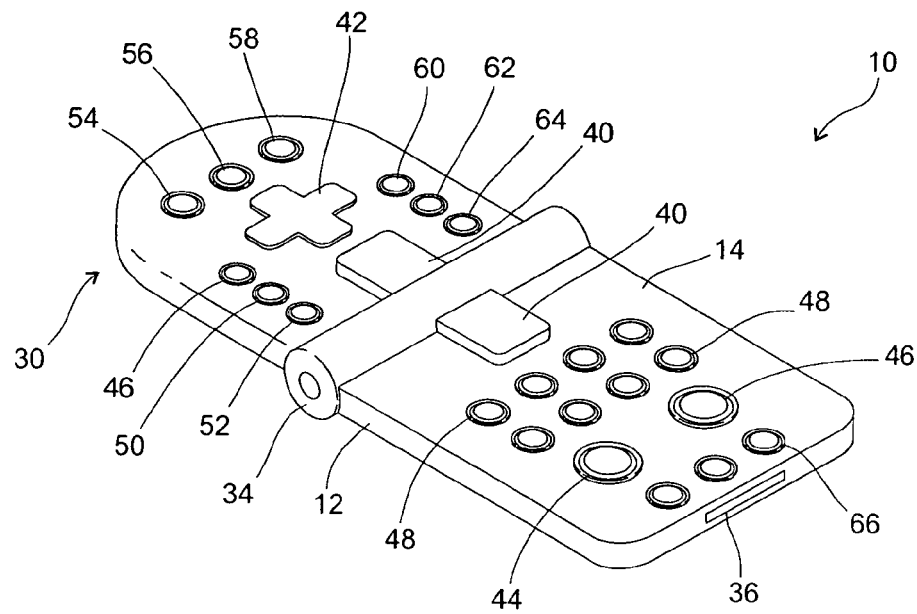
FIG. 2 is a perspective view of the universal combination telephone and remote control device of the present invention illustrating the cordless phone side of the control device.
Figure 3:
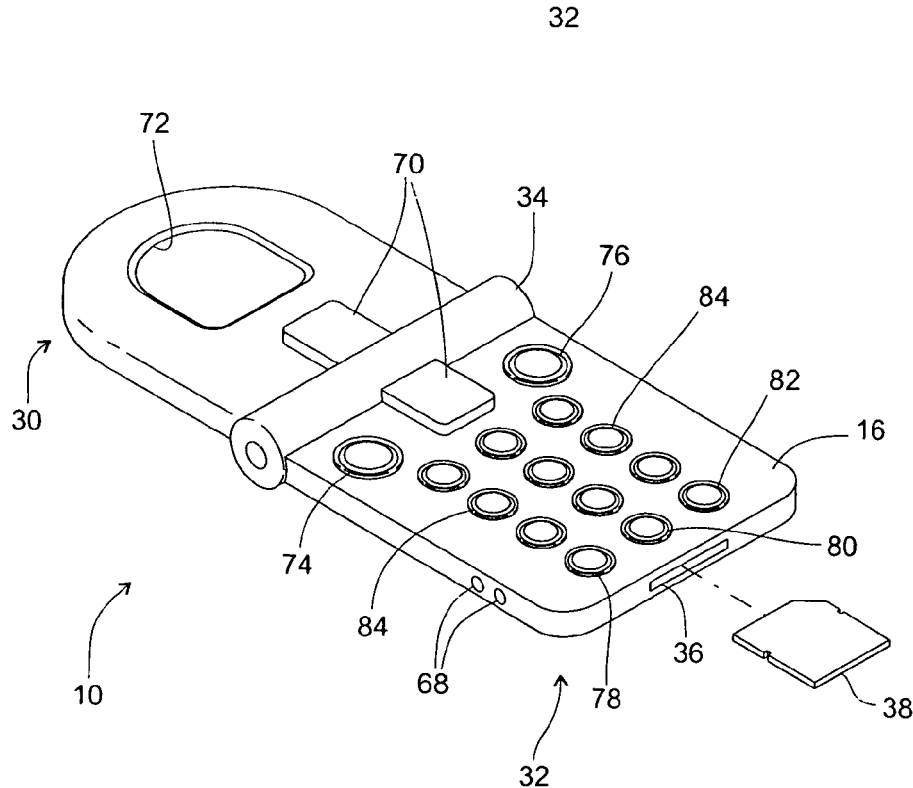
FIG. 3 is a perspective view of the universal combination telephone and remote control device of the present invention illustrating the remote control side of the control device.

As shown in FIGS. 1-5, the universal remote side 14 includes a number of remote control buttons and functions for operating and controlling the television 18 and the interconnected peripheral equipment such as the combination radio, CD, DVD player 20 shown in FIG. 1. Included on the universal remote side 14 are a pair of remote side electrical charging contacts 40 located on opposite sides of the cylindrical seating member 34, a cross-shaped button 42 with left and right stems for up and down channel selection and up and down stems for lower and higher volume selection, a power on/off button 44 and a program guide button 46. In addition, the universal remote side 14 includes a plurality of individual numeric channel buttons 48 for manually pressing and then selecting the desired channel. Also, included on the universal remote side 14 are such standard control options or features that include a menu button 50, a search button 52, a mute button 54, a caption on/off button 56, a replay button 58, a stop button 60, a start button 62, a forward button 64, and a back or reverse button 66. Located on the side of the two-sided housing 12 and adjacent the lower end 32 is two data/electric ports 68 included as an added feature.

The opposite side of the universal remote control side 14, and on the other side of the two-sided housing 12, is the cordless phone side 16. The cordless phone side 16 includes two phone side electrical charging contacts 70 with one charging contact 70 located on either side of the cylindrical seating member 34. An LCD display screen 72 is located on the cordless remote side 16 for displaying incoming phone call numbers, text messages and other data, and the cordless phone side 16 includes a number of telephonic operational and control buttons and functions such as an answer/talk button 74 and an end button 76. Other buttons include, but are not limited to, a redial button 78, a select button 80, a delete button 82, and a plurality of numeric keypad buttons 84. Voice transmitting and receiving apertures are also disposed about the surface of the cordless phone side 16; other buttons can include memory (check messages/calls), pause, channel, speed dial, and address book.

Figure 5:
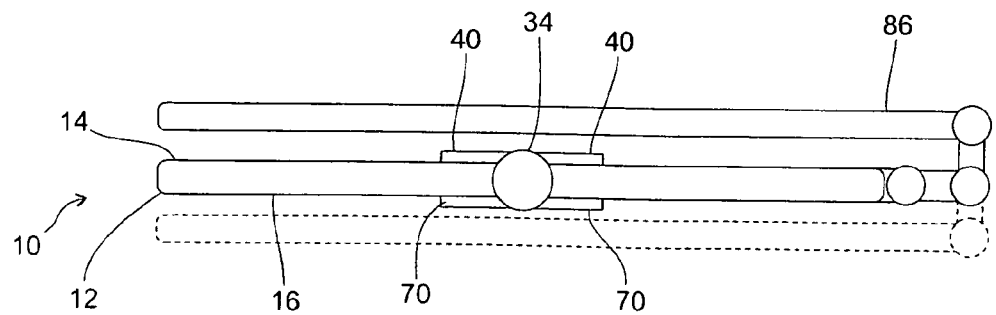
FIG. 5 is a side elevational view of the universal combination telephone and remote control device of the present invention illustrating the various dispositions of a flip-top lid that covers the side of the control device not being used.

As shown in FIG. 5, the universal combination cordless phone/remote control device 10 includes a flip-top lid 86 pivotably attached to the upper end 30 of the two-sided housing 12. The flip-top lid 86 allows the individual to cover the side of the remote control device 10 that is not being used thereby preventing the accidental pressing of buttons that would cause the inadvertent changing of television channels or the interruption in the playing of a CD or DVD of the combo player 20 or the disconnection of a telephone connection. Since both sides 14 and 16 of the control device 10 have electrical charging contacts 40 and 70, when the control device 10 is being recharged with the electrical charging contacts 40 or 70 located on one side—either the remote control side 14 or the cordless phone side 16—the flip-top lid 86 is flipped up and over to cover the opposite exposed side— either the remote control side 14 or the cordless phone side 16—to protect that side from damage and inadvertent engagement and operation.

Figure 4:
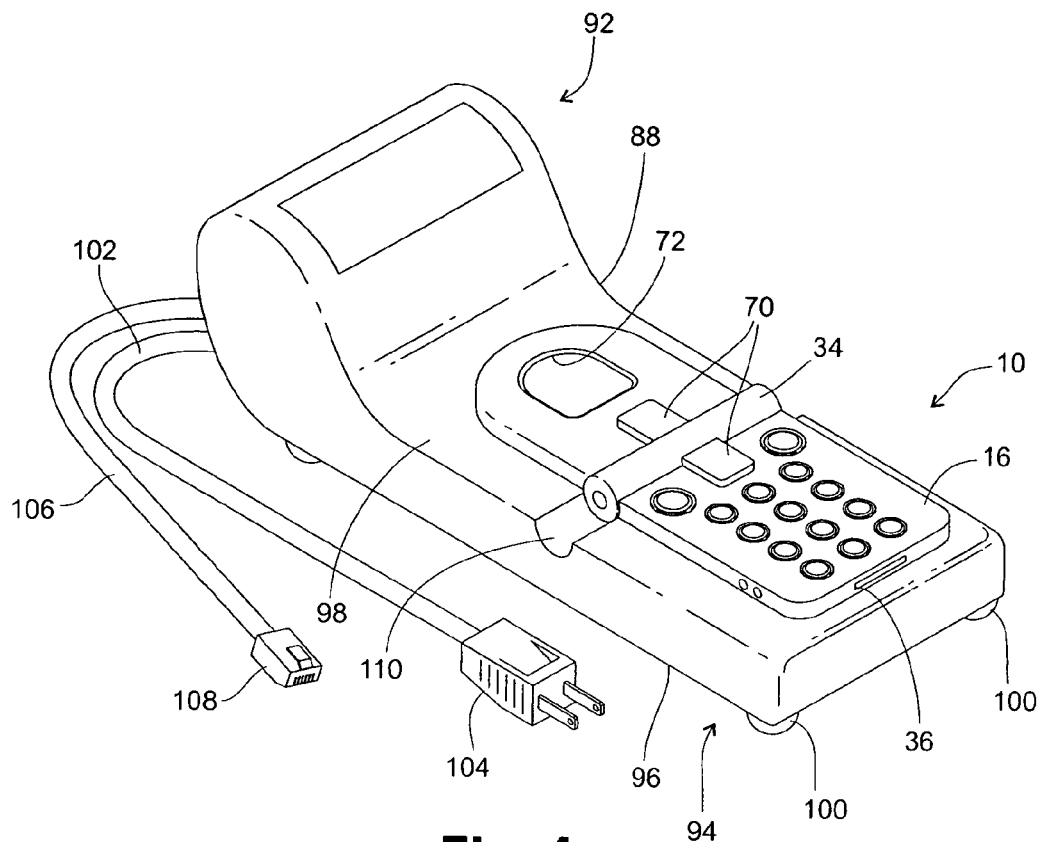
FIG. 4 is a perspective view of the universal combination telephone and remote control device of the present invention illustrating the control device placed upon a charging cradle for recharging.

As shown in FIGS. 1 and 4, a portable, lightweight charging cradle 88 comes with the universal combination cordless phone/remote control device 10 for recharging the device 10. The cradle 88 includes a body or housing 90 that includes an upper head portion 92 and an opposite lower generally flat seating portion 94, with the upper portion 92 enlarged and sloping downward toward and merging with the lower flat seating portion 94. The cradle housing 90 also includes a lower surface 96 and an upper surface 98 coextensive with the upper head portion 92 and the lower seating portion 94 with a display screen 99 located at the upper head portion 92. Four support legs 100 are mounted to the undersurface 96 for providing clearance for the charging cradle 88. Connected to the charging cradle 88 is a power supply line 102 terminating with an electrical plug 104 and a telecommunications line 106 terminating with an electrical jack 108 (the telecommunications line and jack can be for telephone, internet, DSL, broadband interface and communication). Extending transversely across the body 90 is a semi-circular seating groove 110 for receiving therein the cylindrical seating member 34 of the two-sided housing 12 of the control device 10. Located on each opposed side of the seating groove 110 is a charging cradle contact 112, and both charging cradle contacts 112 are aligned with the respective electrical charging contacts 40 and/or 70 on the cordless phone side 16 or the remote control side 114 of the control device 10 when the control device 10 is placed on the upper surface 98 of the cradle 88 with the cylindrical seating member 34 being placed and received within the seating groove 110 thereby aligning the control device 10 upon the cradle 88 so that the electrical contacts— either 40 or 70 since the device 10 can be charged from either side 14 or 16—for engaging the charging cradle contacts 112 thereby initiating the electrical charging of the control device 10.

Figure 6:
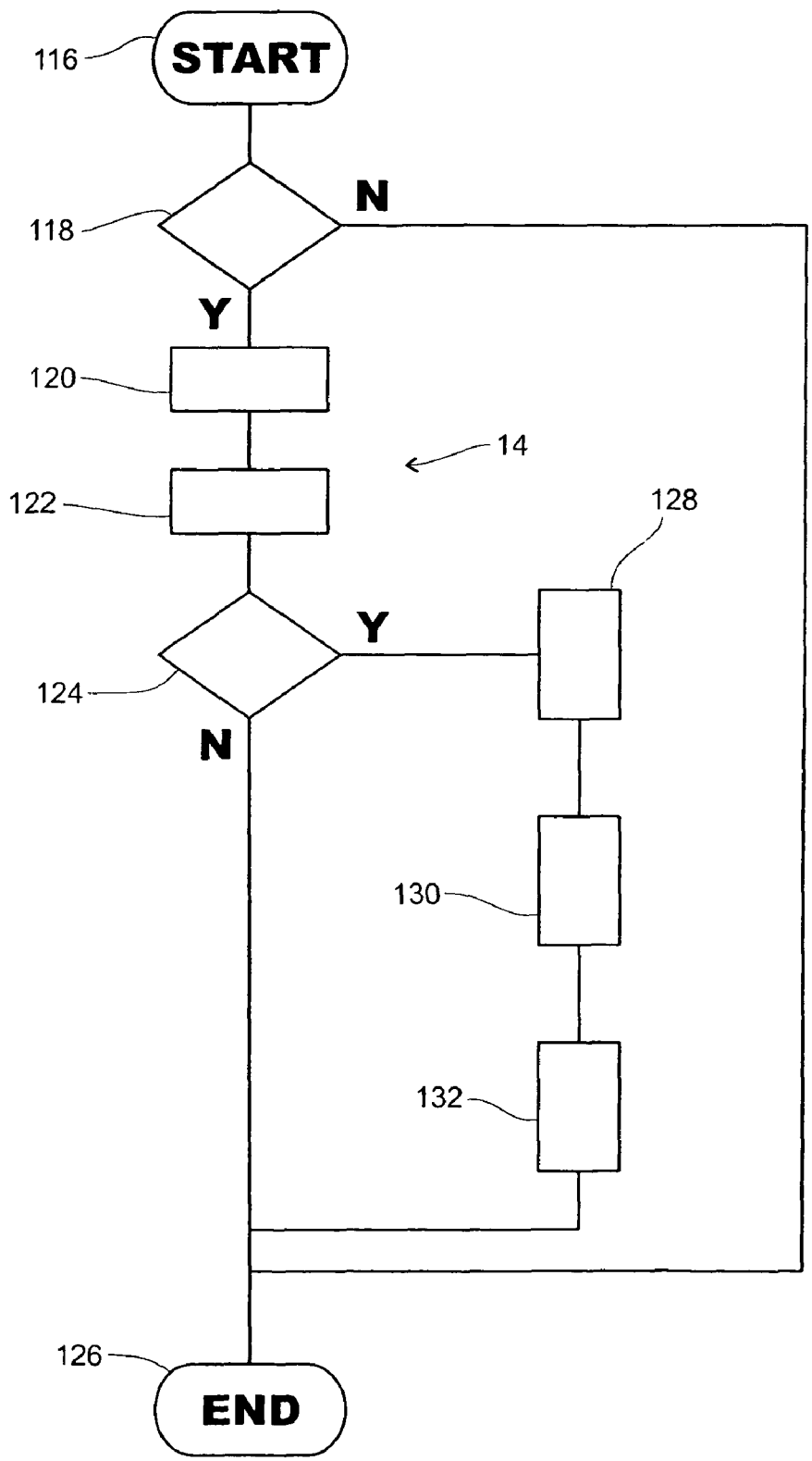
FIG. 6 is a schematic of the universal combination telephone and remote control device of the present invention illustrating a functional flowchart for the control device.

Illustrated in FIG. 6 is a representative flowchart or schematic diagram 114 that shows the operation of the device 10. First, the individual would start 116 by turning the control device 10 on and then pressing the power on/off button to activate/engage the remote control side 118. The individual would then discretely engage 120 the various buttons for discrete TV/peripheral equipment operation 122 by pressing one or more of the aforedescribed buttons on the remote control side as desired. If there is no incoming telephone call, texts, messages, etc. 124, then after the desired television 18 viewing is completed, or CD/DVD/radio player 20 is done, for example, the individual can power off the universal remote control side 14 and reaching the end 126 of device 10 operation. However, with the remote control side 14 on and the individual engaged in operating the television 18 and any peripheral equipment interconnected thereto, should a phone call come in, incoming phone call 124 decision changes to yes (Y), the schematic illustrates that action by first, phone side actuation 128 from receiving the phone call, then engaging in the process of call reception/answer and/or call return/send 130, with the individual then engaging in possibly other functions such as, for illustrative purposes, the check phone messages function 132. While this is occurring the remote control side 14 is on and the individual is still operating the remote control side 14 as the remote control side 14 remains operational and engaged concurrent with and throughout the entire process of answering and responding to the incoming phone call. Thus, the universal combination cordless phone/remote control device 10 is a simultaneous dual use device that enhances one's viewing convenience and pleasure.

Although the various aspects of the invention have been described with respect to specific exemplary embodiments, it will be understood that the invention is entitled to protection within the full scope of the appended claims.

I claim:

1. A universal combination cordless phone/remote control device for simultaneously operating a television and peripheral equipment and receiving and answering incoming telephone calls, comprising:

a control device including a two-sided housing with the two-sided housing further defining an upper end and an opposite lower end;

a card slot located adjacent the lower end;

a cylindrical seating member extending transversely across the device for separating the device into the lower end and the upper end;

the two-sided housing including a remote control side with the remote control side including a plurality of remote control buttons and functions for controlling the operation of the television and peripheral equipment;

the two-sided housing including a cordless phone side opposite of the remote control side with the cordless phone side including a plurality of telephonic phone buttons and functions for controlling telephonic operations;

a flip-top lid pivotably attached to the upper end of the two-sided housing for covering either the remote control side or the cordless phone side;

a pair of remote side electrical charging contacts located on the remote control side of the housing and the remote side electrical charging contacts disposed opposite of each other and beside the cylindrical seating member;

a pair of phone side electrical charging contacts located on the cordless phone side of the housing with the phone side electrical charging contacts disposed opposite of each other and beside the cylindrical seating member;

a display screen located on the cordless phone side of the two-sided housing;

a portable lightweight charging cradle including a housing, an upper surface located on the housing and a semi-circular seating groove extending transversely across the upper surface and sized to receive therein the cylindrical seating member;

a pair of charging cradle contacts located on the upper surface with the charging cradle contacts located opposite of each other and beside the seating groove for alignment with and engagement with the phone side electrical charging contacts or the remote side electrical charging contacts for charging the control device when the control device is placed upon the upper surface of the charging cradle; and whereupon the control device can receive an incoming telephone call on the cordless phone side concurrent with the remote control side maintaining operational control of the television and other peripheral equipment.

2. The universal combination cordless phone/remote control device of claim 1 wherein the remote control buttons on the remote control side include a channel select and volume button, a menu button, a search button, a mute button, a caption on/off button, a plurality of numeric channel buttons, a replay button, a stop button, a start button, a forward button, and a reverse button.

3. The universal combination cordless phone/remote control device of claim 2 wherein the telephonic control buttons on the cordless phone side include an answer/talk button, an end button, a delete button, a plurality of numeric keypad buttons, a redial button, a select button, and a delete button.

4. A universal combination cordless phone/remote control device for simultaneously operating a television and peripheral equipment and receiving and answering incoming telephone calls, comprising:

a control device including a two-sided housing with the two-sided housing further defining an upper end and an opposite lower end;

a card slot located adjacent the lower end;

a cylindrical seating member extending transversely across the device for separating the device into the lower end and the upper end;

the two-sided housing including a remote control side with the remote control side including a plurality of remote control buttons and functions for controlling the operation of the television and peripheral equipment;

the two-sided housing including a cordless phone side opposite of the remote control side with the cordless phone side including a plurality of telephonic phone buttons and functions for controlling telephonic operations;

a flip-top lid pivotably attached to the upper end of the two-sided housing for covering either the remote control side or the cordless phone side;

a pair of remote side electrical charging contacts located on the remote control side of the housing and the remote side electrical charging contacts disposed opposite of each other and beside the cylindrical seating member;

a pair of phone side electrical charging contacts located on the cordless phone side of the housing with the phone side electrical charging contacts disposed opposite of each other and beside the cylindrical seating member;

a display screen located on the cordless phone side of the two-sided housing; and whereupon the control device can receive an incoming telephone call on the cordless phone side concurrent with the remote control side maintaining operational control of the television and other peripheral equipment.

5. The universal combination cordless phone/remote control device of claim 4 further comprising a portable lightweight charging cradle including a housing, an upper surface located on the housing and a semi-circular seating groove extending transversely across the upper surface and sized to receive therein the cylindrical seating member.

6. The universal combination cordless phone/remote control device of claim 5 wherein the charging cradle includes a pair of charging cradle contacts located on the upper surface with the charging cradle contacts located opposite of each other and beside the semi-circular seating groove for alignment and engagement to the phone side electrical charging contacts or the remote side electrical charging contacts for charging the control device when the control device is placed upon the upper surface of the charging cradle.

7. The universal combination cordless phone/remote control device of claim 6 wherein the remote control buttons on the remote control side include a channel select and volume button, a menu button, a search button, a mute button, a caption on/off button, a plurality of numeric channel buttons, a replay button, a stop button, a start button, a forward button, and a reverse button.

8. The universal combination cordless phone/remote control device of claim 7 wherein the telephonic control buttons on the cordless phone side include and answer/talk button, an end button, a delete button, a plurality of numeric keypad buttons, a redial button, a select button, and a delete button.

* * * * *